SHIP'S TELEGRAPH ENGINE ROOM RECORDING MECHANISM

Filed Oct. 25, 1954 8 Sheets-Sheet 1

INVENTOR.
THOMAS P. HUDEN
BY Cook & Robinson
ATTORNEYS

Sept. 29, 1959 T. P. HUDEN 2,906,581

SHIP'S TELEGRAPH ENGINE ROOM RECORDING MECHANISM

Filed Oct. 25, 1954

8 Sheets-Sheet 2

INVENTOR.
THOMAS P. HUDEN
BY Cook & Robinson
ATTORNEYS

Sept. 29, 1959 T. P. HUDEN 2,906,581

SHIP'S TELEGRAPH ENGINE ROOM RECORDING MECHANISM

Filed Oct. 25, 1954

8 Sheets-Sheet 3

INVENTOR.
THOMAS P. HUDEN
BY
Cook & Robinson
ATTORNEYS

Sept. 29, 1959 T. P. HUDEN 2,906,581

SHIP'S TELEGRAPH ENGINE ROOM RECORDING MECHANISM

Filed Oct. 25, 1954 8 Sheets-Sheet 4

INVENTOR.
THOMAS P. HUDEN
BY Cook + Robinson
ATTORNEYS

Sept. 29, 1959 T. P. HUDEN 2,906,581

SHIP'S TELEGRAPH ENGINE ROOM RECORDING MECHANISM

Filed Oct. 25, 1954 8 Sheets-Sheet 5

INVENTOR.
THOMAS P. HUDEN
BY Cook & Robinson
ATTORNEYS

SHIP'S TELEGRAPH ENGINE ROOM RECORDING MECHANISM

Filed Oct. 25, 1954

INVENTOR.
THOMAS P. HUDEN
BY
Cook & Robinson
ATTORNEYS

Sept. 29, 1959 T. P. HUDEN 2,906,581

SHIP'S TELEGRAPH ENGINE ROOM RECORDING MECHANISM

Filed Oct. 25, 1954 8 Sheets-Sheet 7

INVENTOR.
THOMAS P. HUDEN
BY Cook + Robinson
ATTORNEYS

INVENTOR.
THOMAS P. HUDEN
BY Cook & Robinson
ATTORNEYS 2,906,581

SHIP'S TELEGRAPH ENGINE ROOM RECORDING MECHANISM

Thomas P. Huden, Renton, Wash.

Application October 25, 1954, Serial No. 464,290

6 Claims. (Cl. 346—8)

This invention relates to apparatus which, for the purpose of this specification, I have designated as a "ship's telegraph recording mechanism." More specifically stated, the invention relates to an apparatus for recording on a strip of paper all of the operations of the apparatus known in an engine driven marine vessel as the ship's telegraph.

It is the principal object of the present invention to provide a practical, reliable and easy to use recording apparatus of the above stated kind.

It is a further object of the invention to provide a recording apparatus whereby each of the individual signal transmitting operations of the telegraph mechanism that takes place in the operation of the vessel as transmitted between the captain or deck officer and engineer, will be recorded as to the specific signal or order transmitted, the acknowledgement of the signal and the exact time the signal was given and the exact time it was acknowledged.

It is a further object of the invention, to include with the above recording apparatus, means for the recording of the position of the engine direction control lever; means for recording the direction of operation of engine at all times regardless of the position of the control lever; means for indicating if the ship is running on standard, home port, advanced or retarded time.

Another object is to provide the mechanism with means that permits release of supply roll and rewinding roll as may be required to facilitate the changing of time, or to accommodate various conditions under which the apparatus is used.

Yet another object is to provide for the writing in of information on the record strip when such is desired.

In accomplishing the above mentioned and other objects of the invention, I have provided the improved details of construction, the preferred forms of which are illustrated in the accompanying drawings, wherein.

Referring more in detail to the drawings:

Briefly described, the present apparatus is employed for the graphic recording of the transmission of signals or running orders between, for example, the pilot house of a steamship and the engine room through the mediacy of the equipment known generally as the "ship's telegraph" and with which practically all engine driven marine vessels are equipped. In addition thereto, the apparatus provides for the automatic recording of the direction of operation of the engine, the position of the engine control lever, the exact time that signals were given and the exact time of their acknowledgement; each of these items, and others, being graphically recorded on a continuous strip of paper, referred to as the record strip, that is ruled with longitudinal columns for the recording of the individual items therein, and is transversely ruled to set off definite time intervals; this record strip being normally continuously advanced by a clock mechanism.

The recording of each of the various items on the record strip is effected through the mediacy of a scriber which might be a pencil or pen, the point of which scriber normally rides on the strip and is shiftable laterally in one direction or the other to indicate a change in the operation.

Figure 18:
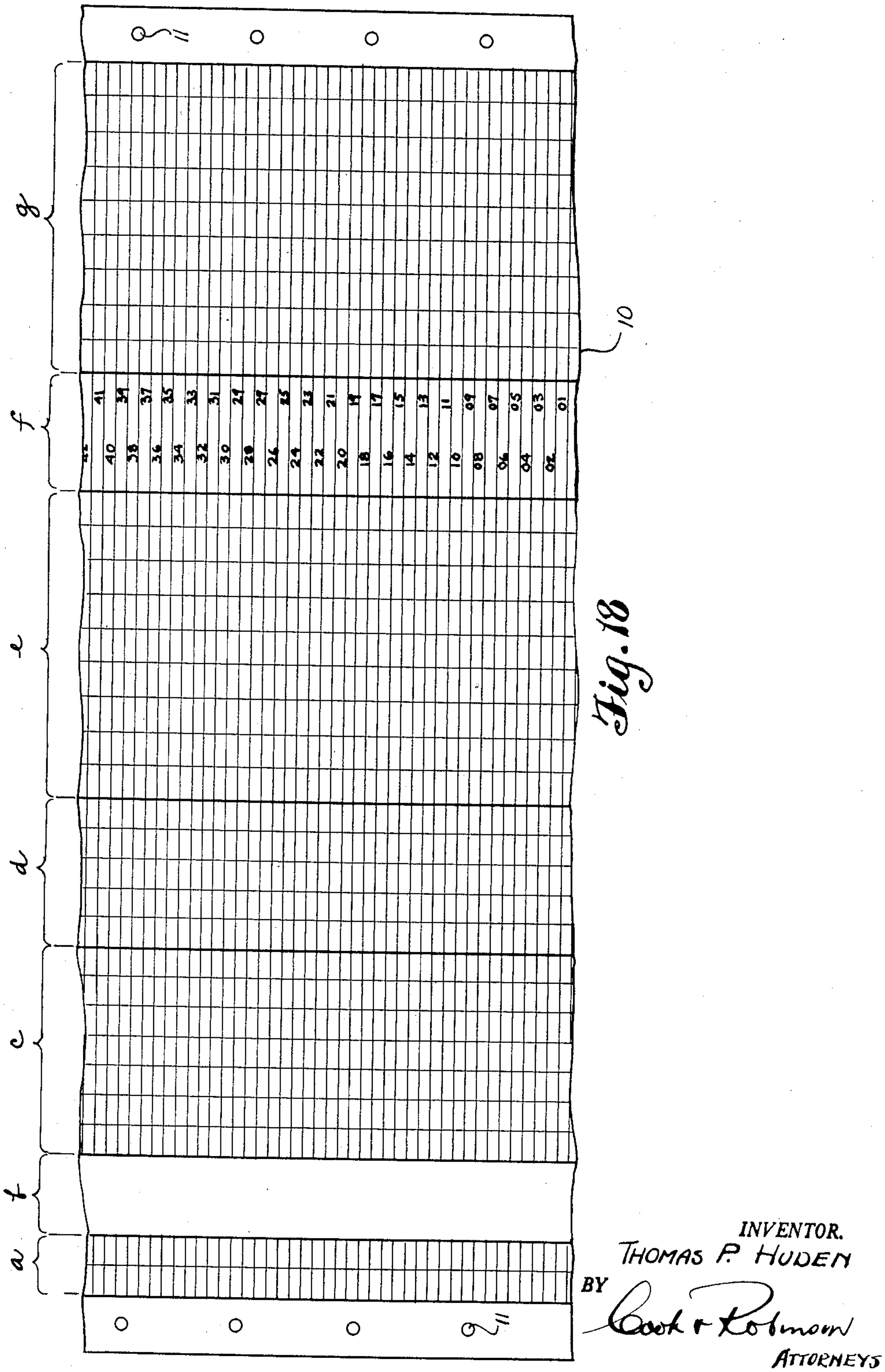
Fig. 18 is a view of a short section of the record strip used for the recording of the various operations thereon.

The record strip 10, on which the operational items are recorded by the marks left by the pens, is ruled as shown in Fig. 18 which shows a full width but short section of the strip. The strip is longitudinally ruled by relatively heavy lines that are spaced to set off the columns that, in Fig. 18, are spanned respectively by brackets *a*, *b*, *c*, *d*, *e*, *f* and *g*; these various columns also being longitudinally ruled by lighter lines for purposes presently explained. Along its opposite longitudinal or border edges, the record strip is formed with evenly spaced perforations 11 that are adapted to receive therein sprockets on a timing roll over which the record strip is drawn thus to regulate its rate of travel under the influence of a strip winding mechanism presently to be described.

Figures 1, 2, 19:
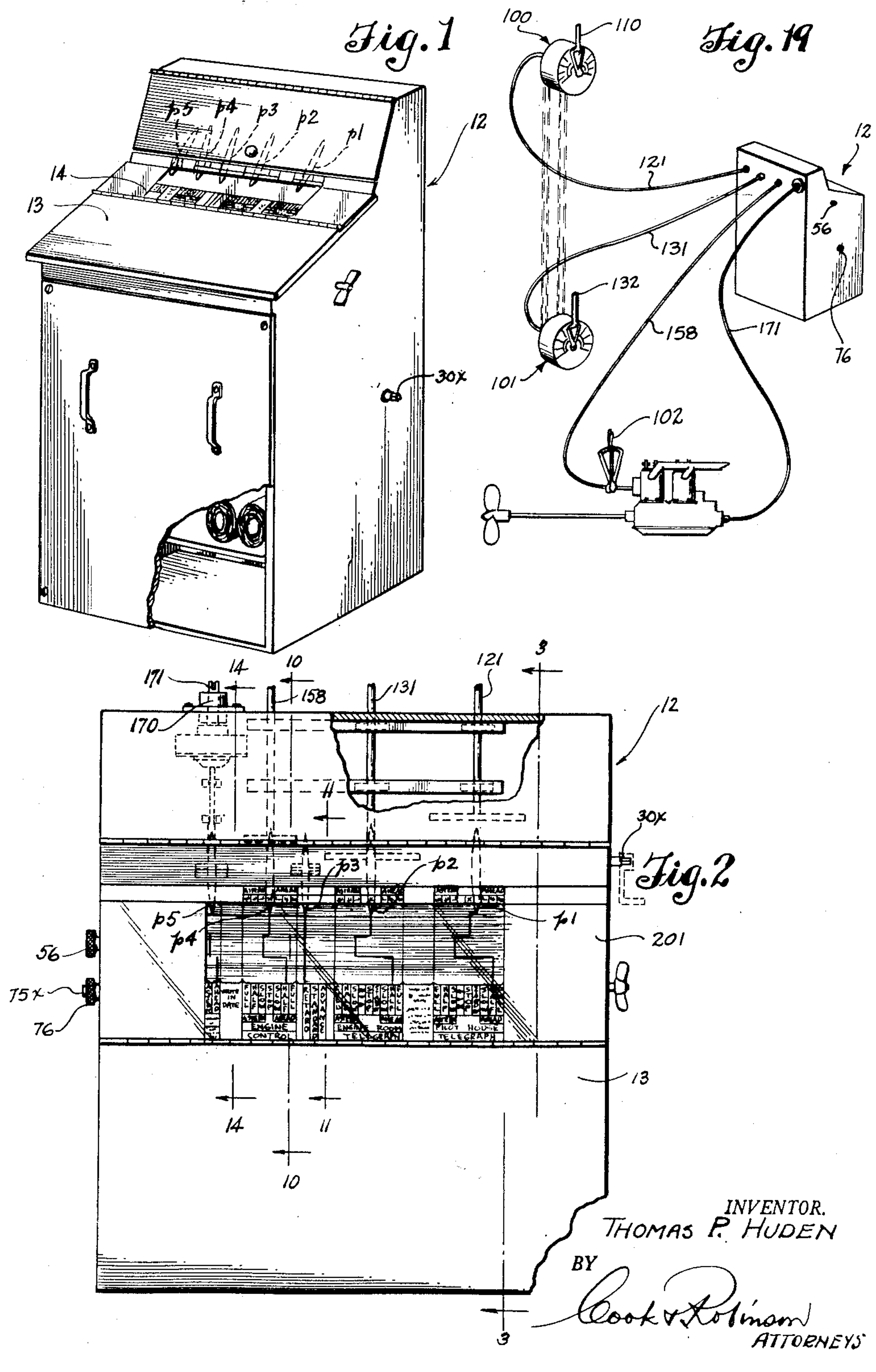
Fig. 1 is a perspective view of a cabinet in which the apparatus embodying the present invention is housed; a part of the front wall of the housing being broken away to show the record roll storage space.
Fig. 2 is a top view of the cabinet, showing the relative position of the recording scribers, and the window beneath which the record strip is advanced.
Fig. 19 is a view diagrammatically illustrating the connections between the present apparatus and the various telegraph controls.

The housing in which the recording mechanism and paper strip are housed, is herein designated in its entirety in Figs. 1 and 2 by reference numeral 12. It is of cabinet form, and preferably is equipped at the top with a downwardly sloping top 13, formed with a rectangular opening 14 beneath which the record strip 10 is caused to move under influence of the strip winding mechanism and control of the timing roll.

Figure 3:
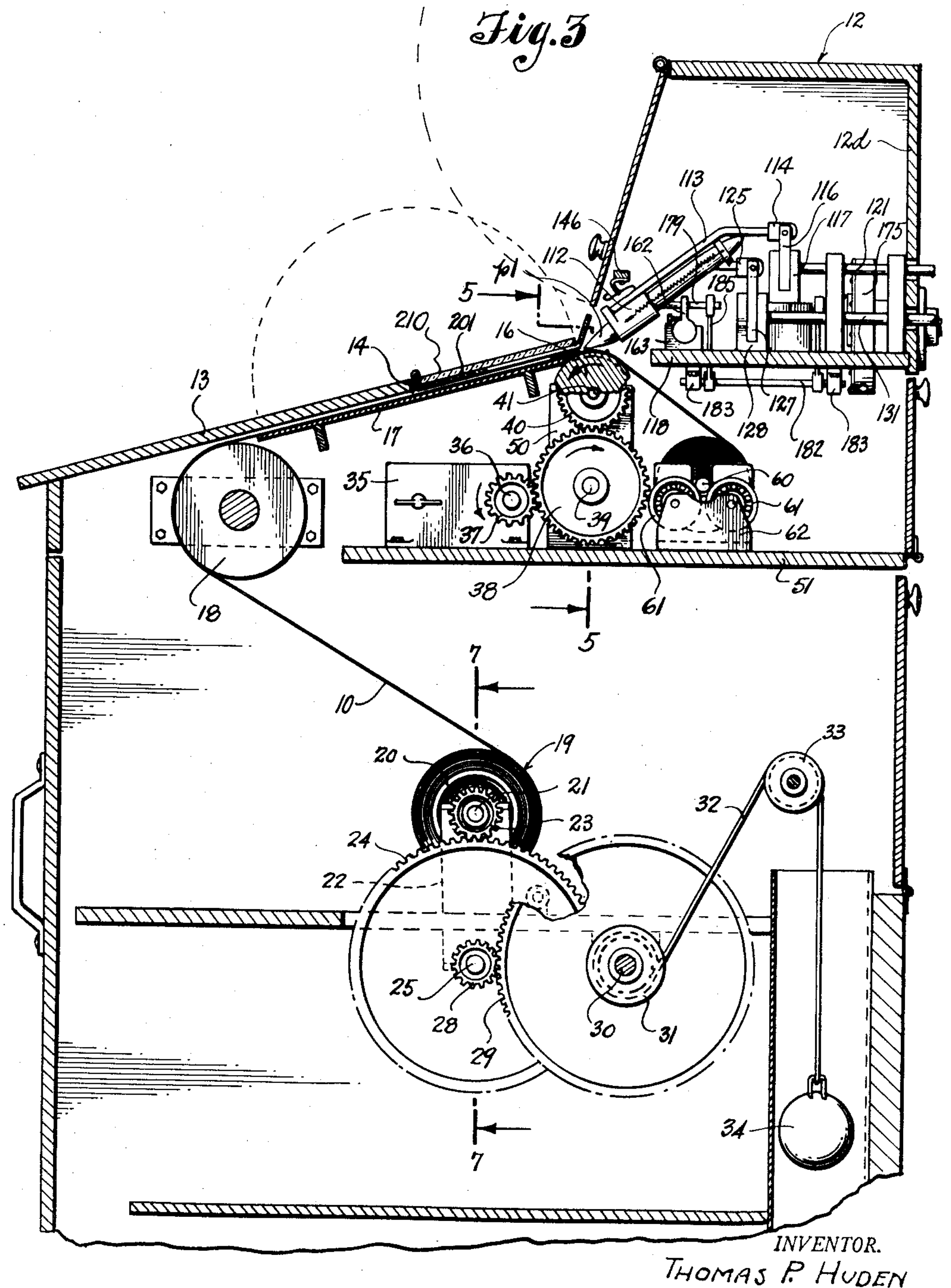
Fig. 3 is a somewhat enlarged vertical section through the cabinet and its contained mechanism; the section being taken substantially on line 3—3 in Fig. 2.

In Fig. 3 of the drawing, it is shown that the record strip 10 is drawn from a supply roll 15 passes across the top side of the timing roll designated in its entirely by numeral 16, thence across a table 17 that is fixedly supported in the cabinet parallel with and immediately beneath the top 13 and opening 14 therein, thence over a freely rotatable guide roll 18 supported rotatably in the forward portion of the cabinet, and thence back to a strip winding roll, designated generally at 19, onto which it is wound as fed thereto by the timing roll, under the influence of roll driving gears and a suspended weight as shown in Fig. 3 and presently described.

Figures 5, 6:
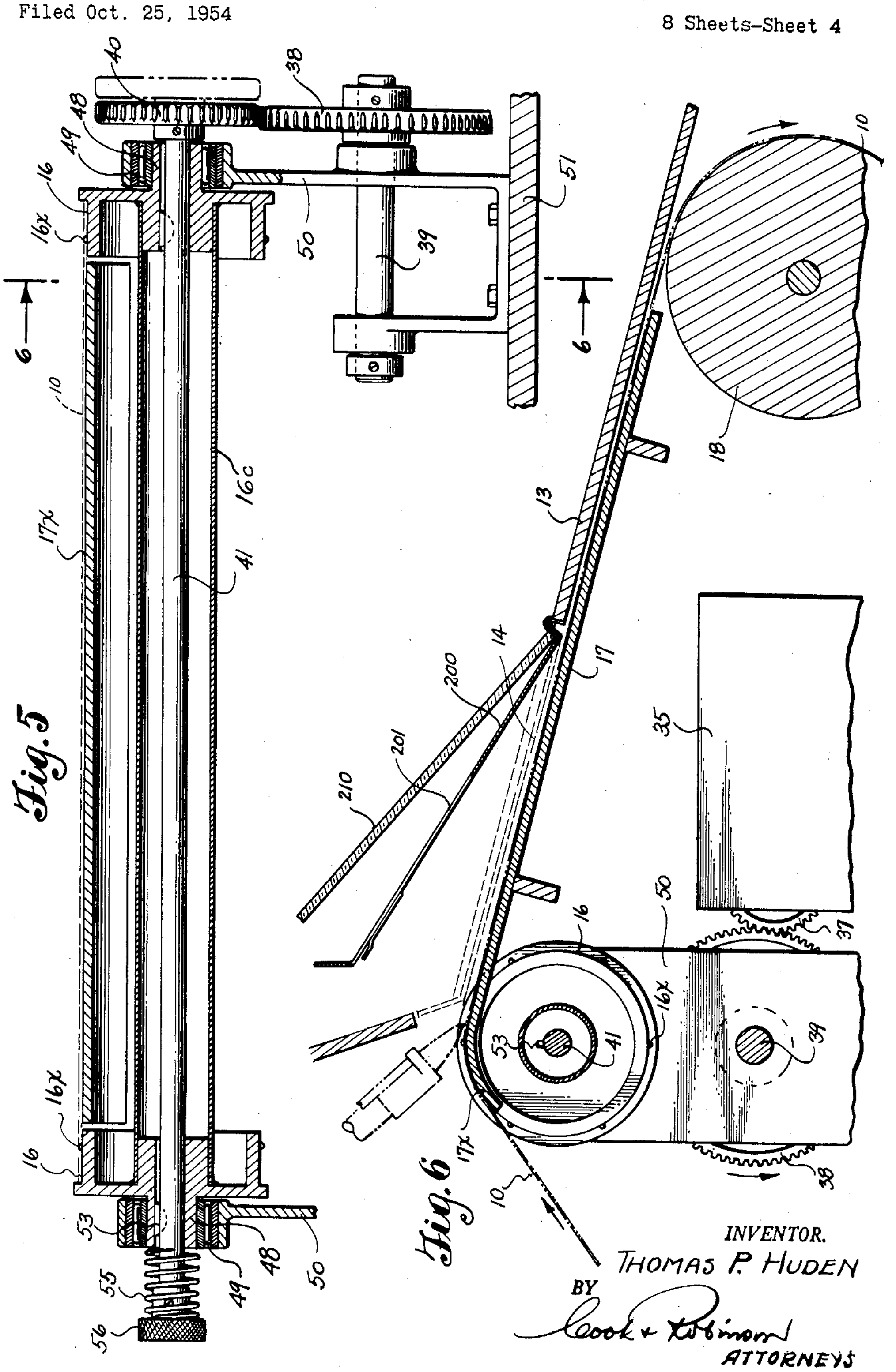
Fig. 5 is an enlarged longitudinal section of the paper strip feeding roll and its driving gears, taken on line 5—5 in Fig. 3.
Fig. 6 is a cross-section, taken on the line 6—6 in Fig. 5.
Figures 7, 8, 9:
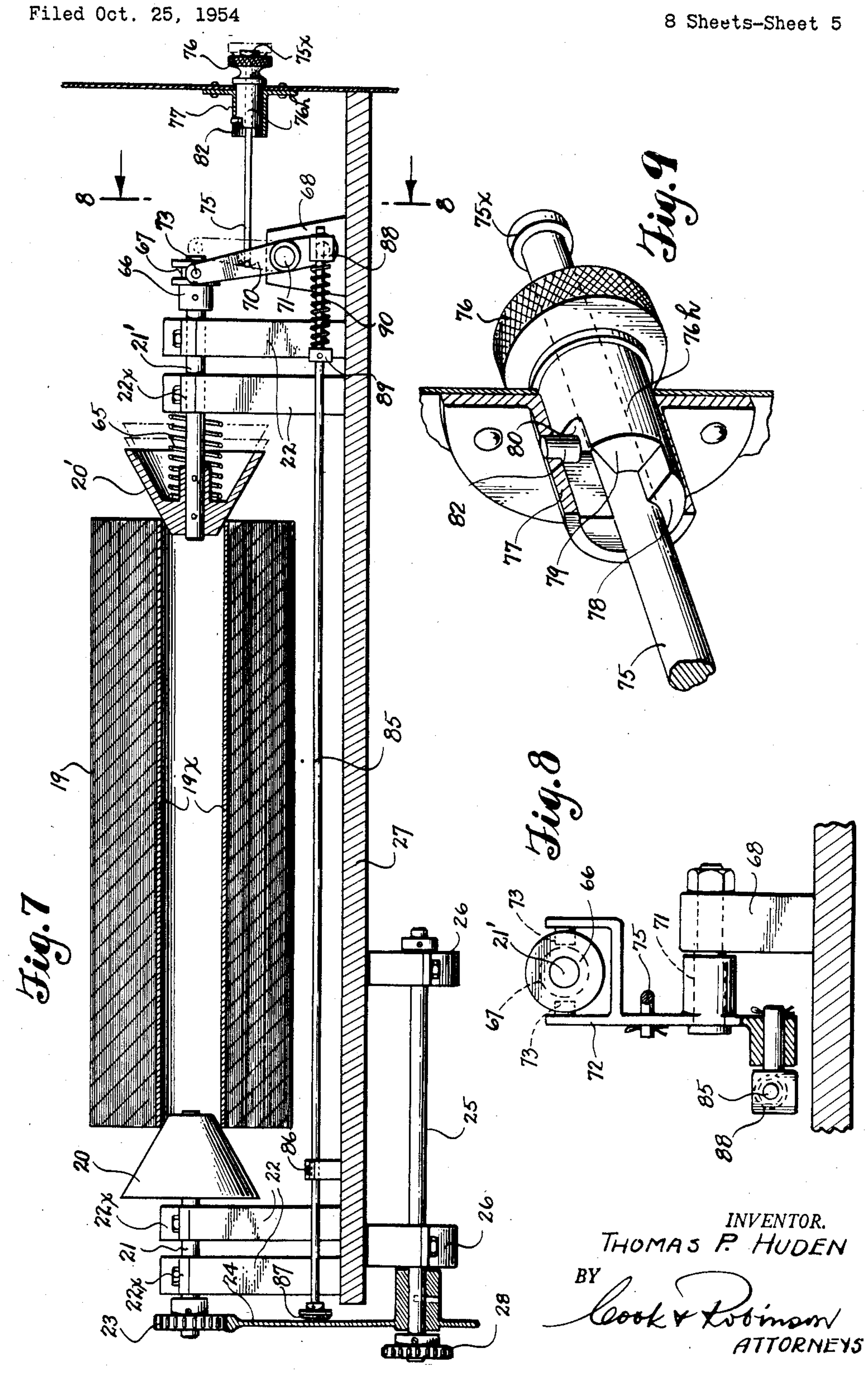
Fig. 7 is a longitudinal section of the record strip winding roll, its mounting means and braking devices; the section being taken on line 7—7 in Fig. 3.
Fig. 8 is a vertical section on line 8—8 in Fig. 7.
Fig. 9 is a perspective view showing the brake release and roll support adjusting knobs.

It is shown in Fig. 7 that the roll 19 is wound on a tubular core 19*x* which is functionally held between conical spools or supports 20—20′, which project into the opposite ends of the tubular core. These conical spools are mounted by horizontal supporting shafts 21 and 21′ that are rotatably mounted in bearings 22*x* at the upper ends of supports 22 attached to a cabinet shelf. The shaft 21 carrying the spool 20 is equipped at its outer end with a driving gear wheel 23. Meshing with gear wheel 23, is a larger gear wheel 24 that is fixed on a supporting shaft 25 that is rotatably mounted on bearings 26—26 fixed to the underside of a horizontal shelf 27 of the cabinet; this being the shelf to which the supports 22 are fixed. Fixed on shaft 25 is a small gear 28 in mesh with a larger driving gear wheel 29 fixed on a shaft 30 which is rotatably supported in a bearing 30*x* also fixed to shelf 27. The shaft 30 has a cable drum 31 fixed thereto about which a cable 32 is wound. The cable 32 extends upwardly from the drum over a pulley 33 mounted on a pivot pin 33*x* fixed in the adjacent end wall of the cabinet, thence downwardly and has a heavy weight 34 attached thereto. Thus, through the mediacy of the cable 32, the intermeshing gears 23, 24, 28 and 29, end spool 20, the roll 19 will be rotated to wind in the paper record strip 10 as fed thereto by the controlled rotation of the timing roll 16. The roll 16 is positively rotated at a predetermined and uniform speed through geared connection with a suitable clock mechanism such as has been designated by numeral 35 in Fig. 3. The clock mechanism has a driven shaft 36 extended therefrom that is equipped at its outer end with a small gear wheel 37 that meshes with a large idler gear 38 supported to revolve on a stub shaft 39, that is supported, as shown in Fig. 5, in a bracket 50. Gear 38 meshes with and drives a gear wheel 40 that is fixed on a drive shaft 41 that extends axially through and by which the roll 16 is timed in its rate of rotation as the means for definitely timing the rate of travel of the record strip 10.

It has been shown best in Fig. 5 that the roll 16 has hubs 48—48 of reduced diameter at its opposite ends, these being revoluble in anti-friction bearings 49—49 that are mounted in brackets 50—50 that are fixed in spaced relationship to a horizontal shelf 51 that is secured within the cabinet. Extended longitudinally of the roll, and axially through the two hub portions thereof, is the previously mentioned shaft 41; this being slidably keyed axially within the hubs, by the keys 53. On one end, the shaft 41 carries the gear wheel 40 which is adapted to be shifted into and from driving mesh with the gear wheel 38 by longitudinal shifting of the shaft 41. Normally, the gears are held in mesh by the yielding force of a coiled spring 55 that, as shown in Fig. 5, is applied under compression between a knob 56 that is fixed on the left hand end of the shaft 41, as shown in Fig. 5, and the adjacent shaft supporting bracket bearings. To permit free turning of roll 16, the knob 56 is pressed inwardly, thus causing shaft 41 to move endwise and disengage the gear 40 from gear 38.

It is to be observed in Figs. 5 and 6, that the opposite cylindrical end portions of the roll 16 are equipped with evenly spaced knob-like sprockets 16*x* designed for passing into the spaced holes or perforations 11 of the record strip to effect the positive control of the strip by the roll. It is to be observed by reference to Figs. 5 and 6, that the roll 16 is formed by the opposite end hub equipped portions, spaced by a tubular core portion 16*c* of reduced diameter, thus providing that the upper end portion of table 17 can be received between the hub carrying portions. Fig. 6 also shows the upper end portion of the table curved to the radius of the roll for the easy drawing of the record strip thereover.

The paper supply roll 15 is shown in Fig. 3 to be mounted by a shaft 60 which, at each of its opposite ends, is supported for rotation by and between two coacting rollers or wheels 61—61 carried by frames 62 fixed upon shelf 51.

When a roll 19 has been filled it is released from support between the spools 20 and 20′. This release is accomplished by means shown in Figs. 7, 8 and 9 described as follows: The spool 20′ is supported by its shaft 21′ in bearings at the upper ends of the two supports 22—22, for endwise shifting. A coiled spring 65, disposed between the spool and adjacent post 22 urges the spool into the end of the tubular core of the supported roll. On the outer end of the shaft 21′, a collar 66 is fixed. This is formed with an encircling channel 67. Pivotally mounted on a supporting block 68 fixed upon shelf 27 is a lever arm 70; this being mounted between its ends by a pivot member 71 fixed to the block. At its upper end the lever 70 has a yoke portion 72 that embraces the collar 66, as shown best in Fig. 8, and studs 73 extend from the yoke arms into the channel 67 to effect an operative connection with the shaft 21 for shifting the spool 20′. Pivotally connected with the upper portion of the lever arm 70, below the yoke, is one end of a pull rod 75 which has its outer end portion extended rotatably through a knob 76; the knob being retained by an enlargement 75*x* at the rod end. The knob has a mounting hub portion 76*h* that is rotatably and longitudinally movable in a bearing sleeve 77 that is fixed, as shown in Fig. 7, in a sidewall 12*x* of the cabinet for the apparatus. The inner end portion of the hub 76*h* is formed with a stepped recess providing three shoulders 78, 79 and 80, at spaced intervals therealong, as shown in Fig. 9. Extending inwardly from a wall of the sleeve 77 is a stud 82 against which the shoulders may be selectively engaged by rotative adjustment of the knob. When the knob is pulled out, as in dotted lines in Fig. 7, and the shoulder 78 is seated against the stud, 82, the spool 20′ will be held clear of the end of roll 19 for its removal or displacement. When the knob is disposed with its intermediate shoulder 79 disposed against the stud 82, the spool 20′ will be merely loosened in the roll and will permit an easy withdrawal of the strip therefrom for rewinding on 15.

When the knob is adjusted to engage the shoulder 80 against the stud 82, the spool 20′ will then be held firmly seated by spring 65 in the end of tubular core 19*x* for support of the roll for operation.

In order that the gear train with which the weight 34 is attached may not be allowed to run free when the roll 19 is loosely mounted or removed from between the two spools 20 and 20′, I provide a holding brake mechanism as shown in Fig. 7. This comprises a rod 85, disposed just above the shelf 27 and slidable near one end through a supporting bearing 86. A friction head 87 on that end of the rod is adapted to be pressed against a face of the gear 24 to hold it against rotation. At its end which is opposite that equipped with the head 87, the rod passes slidably through a block 88 that is pivoted on the lower end of lever 70. Fixed on the rod, a distance spaced from the block 88, is a stop 89 and a coiled spring 90 is applied about the rod between the block 88 and stop 89 to yieldingly urge the rod to brake applying position. However, when the lever 70 is in operating position, that being its full line position in Fig. 7, pressure of the spring 90 against stop 89 is relieved and no braking pressure is effected. However, in the loosened or disengaged position of the spool 20', as effected by lever 70, the braking pressure is applied.

Figure 4:
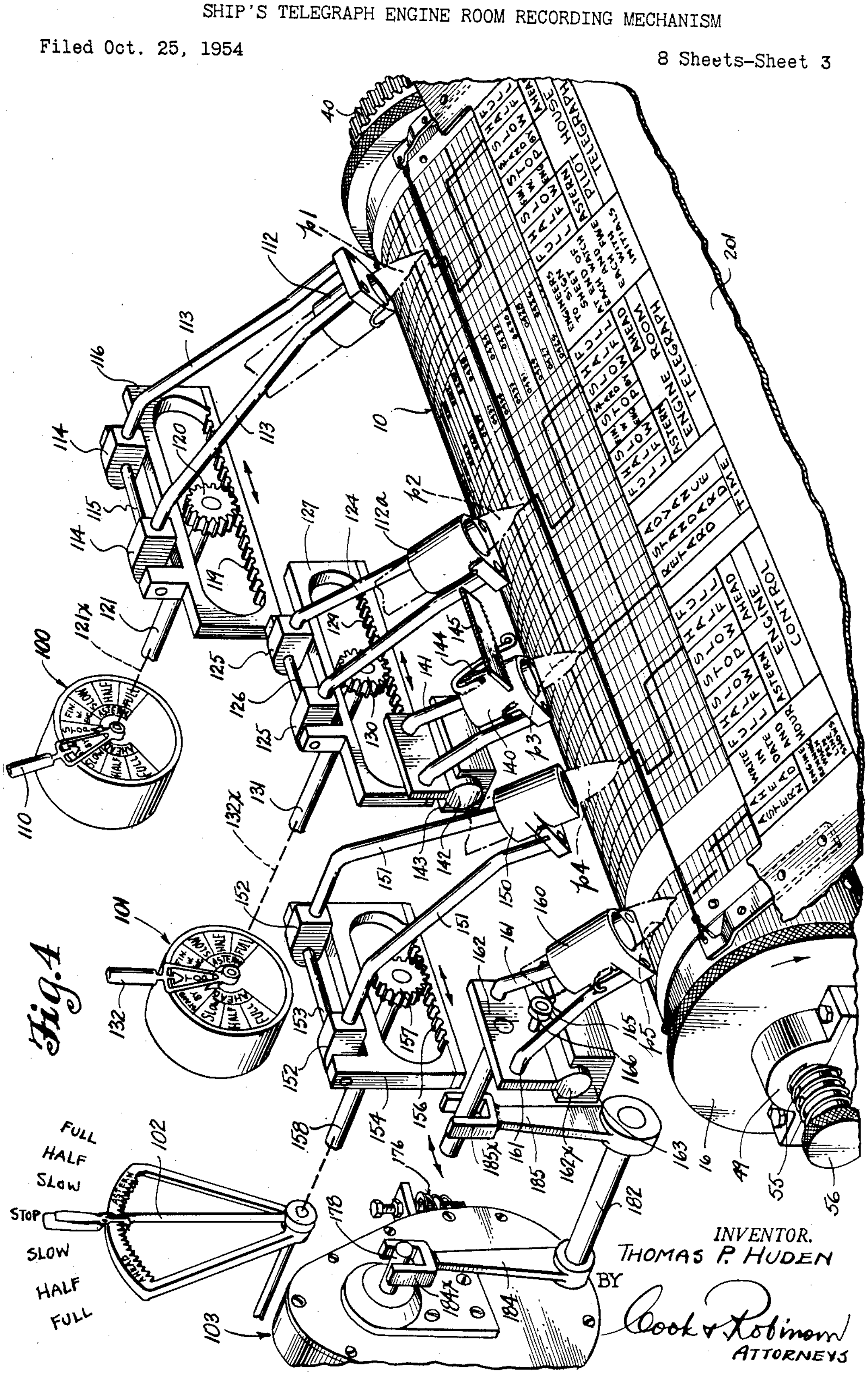
Fig. 4 is an enlarged perspective view showing the record strip timing roll and record strip passing thereover, and the various scribers and their respective controlling mechanisms.

For the purpose of recording the operations of the ship's telegraph, I have provided the mechanisms shown best in perspective in Fig. 4. In this view, I have designated the pilot house mechanism in a general way by reference numeral 100, and have designated its complemental mechanism of the engine room, by numeral 101. The lever which the engineer manipulates between "ahead" and "astern" positions to control the direction of operation of the engine, is designated by numeral 102. The means which operates to indicate direction of operation of the engine, regardlesss of position of the lever 102, is designated in its entirety in Fig. 4 by numeral 103.

The record of the operations of each of those mechanisms is made on the record strip 10 by scribing, or line marking instruments which preferably are in the nature of fountain pens, and will be referred to as "pens," each of which is supported for resting its point properly on the record strip for marking and is adapted to be moved laterally in opposite directions by supporting means which will be individually described as the specification progresses.

The pilot house telegraph mechanism 100 includes, as a part thereof, a hand lever 110 that is pivoted for oscillating adjustment in the "ahead" direction, from a vertical "stop" position successively through the positions of "stand by," "slow," "half speed" and "slow speed." Likewise, it can be swung in the "astern" direction, successively through the positions of "finished with engine," "slow," "half speed" and "full speed."

The pen which records these movements is designated in Figs. 3 and 4, by reference character *p*1. It is fitted in a carrier sleeve 112, rigidly affixed to the swinging ends of a pair of supporting rods 113—113 that have their other ends fixed in blocks 114—114 pivoted on a horizontal rod 115 that is mounted between upstanding bosses on a slide 116 that is contained for endwise movement in a guideway 117 that is fixed upon a supporting shelf 118. This shelf is fixed in the upper portion of the housing 12 as seen in Fig. 3. The slide 116 is formed with a longitudinal gear rack 119 with which a small gear wheel 120 is in operative mesh. Gear 120 is fixedly mounted on a shaft 121 and this has an operative connection of any suitable kind, designated in Fig. 3 at 121*x*, with the handle or lever 110 of the pilot house mechanism 100 so that it will be caused to rotate in direction and extent in accordance with the actions of the lever 110. Thus, if the lever 110 is swung to the "ahead" side, the slide 116 will shift accordingly to the right, in respect to its showing in Fig. 4. Likewise, if the lever 110 is swung to the "astern" side, then the slide 116 will be moved accordingly toward the left. The pen *p*1 normally rests on the record strip 10 as indicated in Fig. 3, and with the lateral adjustments of the slide 116, it leaves its mark on the record strip to indicate this movement and its extent.

It is to be noted in Fig. 4, that the column *g* of strip 10 is longitudinally lined to divide it into lanes that correspond to the nine lever setting positions marked on the face of the pilot house instrument 100.

By reason of the mechanisms above described, the movement of the lever 110 to any selected signaling position as designated on the face of the instrument, simultaneously actuates the pen to the corresponding lane in the column *g* of the record strip. The pen leaves a line on the moving strip 10 to record the position of setting of the lever 100 at any time. Also, to show changes in setting and the time the setting or change in setting was made.

The pen for recording the adjustments made by actuation of the engine room mechanism 101 is designated by reference character *p*2. The supporting means and the means for the actuation of the pen are substantially like those associated with pen *p*1. The pen *p*2 is functionally held in a sleeve 112*a* carried by a pair of rods 124—124, with ends fixed in blocks 125—125 that are pivoted on a horizontal rod 126 fixed on a slide 127 that is mounted for endwise adjustment in a guide block 128, shown in Fig. 3; this block also being fixed to shelf 118. The slide is equipped with a longitudinal rack 129 with which a small gear 130 is in operative mesh. Gear 130 is fixed on a shaft 131 that has a suitable operative connection through which it is caused to rotate in accordance with the adjustments of the lever 132 of the engine room instrument 101. This connection is herein designated by the showing of the flexible shaft 131*x* in Fig. 19. The pen *p*2 therefore, as it rests on the moving record strip 10, leaves a line to record the position of lever 132 at all times, its changes in setting and the time changes were made. The record, as made by this pen *p*2, is confined to the column *e* on the record strip, which column as shown in Fig. 18, is lined to provide it with the longitudinal lanes which, respectively, correspond to the nine positions of setting the lever 132 shown on the face of instrument 101.

The pen for recording time on which the run is being made, and any change from one time to another, is designated by reference character *p*3. It is disposed for recording in the column *d* of the record strip, and this column is longitudinally ruled and thereby divided into different time lanes, designated respectively as "retard," "standard" and "advance." This pen is manually set in the selected lane to record the time used and it is manually moved from one lane into another. There is no automatic changing of this pen.

Pen *p*3 is fitted in a collar 140 carried by paired rods 141—141 fixed in a bar 142 that is rotatably supported in a block 143 attached to shelf 118. To move this pen from one lane to another, it is shifted by moving the block 142 endwise across the record strip to the selected lane. The pen is held in place by a small spring 144 fixed on the sleeve 140 and bearing upwardly against the notched edge of a bar 145 that is fixed, against movement to a supporting bar 146, as seen in Fig. 2; this bar being fixed in the cabinet.

Figures 10, 11, 12:
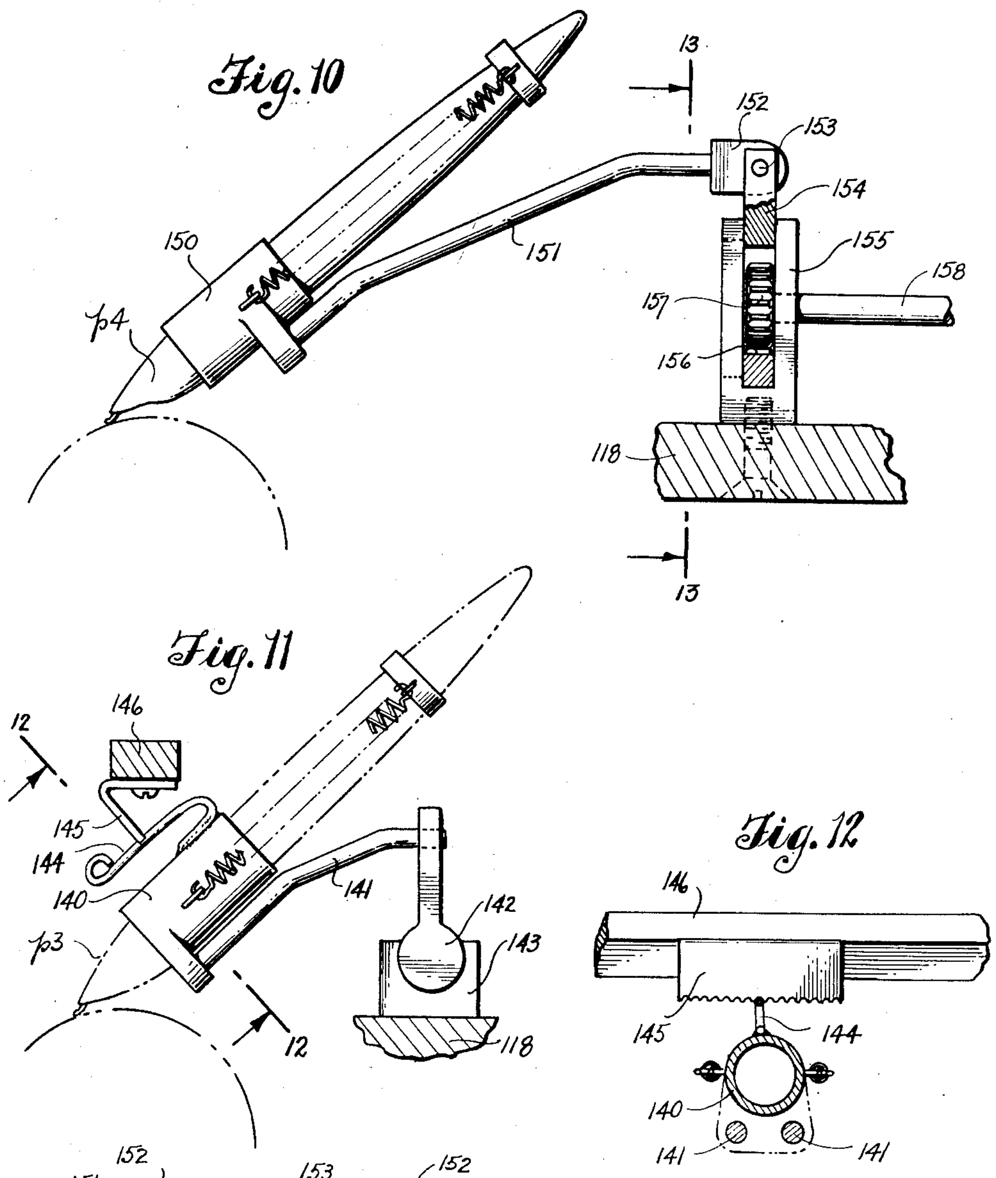
Fig. 10 is an enlarged, cross-section of scribe supporting parts taken substantially on line 10—10 in Fig. 2.
Fig. 11 is a similar enlarged cross-section taken on line 11—11 in Fig. 2.
Fig. 12 is a cross section on line 12—12 in Fig. 11.
Figure 13:
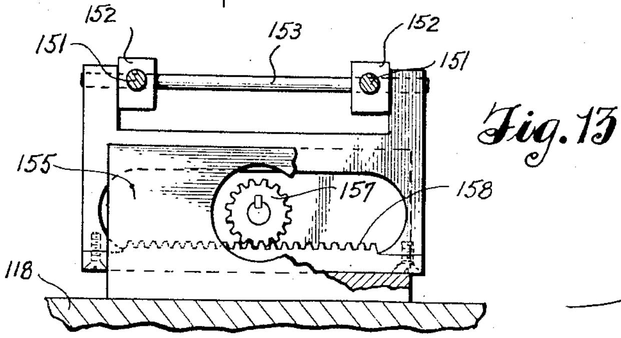
Fig. 13 is a cross section on line 13—13 in Fig. 10.

The pen that records "engine control" is designated by reference character *p*4. It is supported as shown in Figs. 2 and 10 in position for leaving its recording mark in the column *c* of the record strip 10; this column being ruled to divide it into seven longitudinal lanes corresponding to "full," "half" and "slow" for both "reverse" and "ahead" settings of the control lever 102 and also to "stop." This pen is fitted in a collar 150 carried by paired rods 151—151 fixed to blocks 152—152, pivoted on a horizontal rod 153 mounted on a slide 154. This slide is contained for endwise shifting in a guide 155 fixed to shelf 118.

The slide 154 has a gear rack 156 formed therealong with which a small gear 157 is in operative mesh. Gear 157 is fixed on a shaft 158 that, by suitable means, is connected with lever 102 for rotative adjustment in opposite directions incident to oscillating adjustments of the lever, thus to shift the pen *p*4 for the recording of the position of the engine control lever at all times and time of its changes in setting.

Direction of engine operation is recorded by pen *p*5 under control of the mechanism herein designated in its entirety by numeral 103. This pen is fitted in a collar 160 carried by a pair of rods 161—161 with ends mounted in the top edge portion of a bar 162 formed with a cylindrically rounded lower edge portion 162*x* that is rotatably contained and longitudinally shiftable in a mounting block 163. Block 163 is fixed upon shelf 118. Normally the pen *p*5 rides on the record sheet 10 within the column *a*. This column is divided into two longitudinal lanes in which "astern" and "ahead" operations of the engine, respectively, are recorded. The shifting of the pen *p*5 from one lane to the other in this column is effected by a longitudinal adjustment of the bar 162 in the guide block 163, and during any such shifting, the pen is held lifted from the record strip. This lifting and holding is effected by a cam rise 165 formed on a horizontal top edge of the guide 163, and which coacts with a roller 166 that is carried by a stud 167 fixed in the bar 162 in such position that when the bar is shifted, the roller is caused to ride upon the cam and thus cause a rearward tilting of bar 162 with an incident lifting of the pen from the record strip through the mediacy of its carrying parts 160 and 161.

Figures 14, 15, 16, 17:
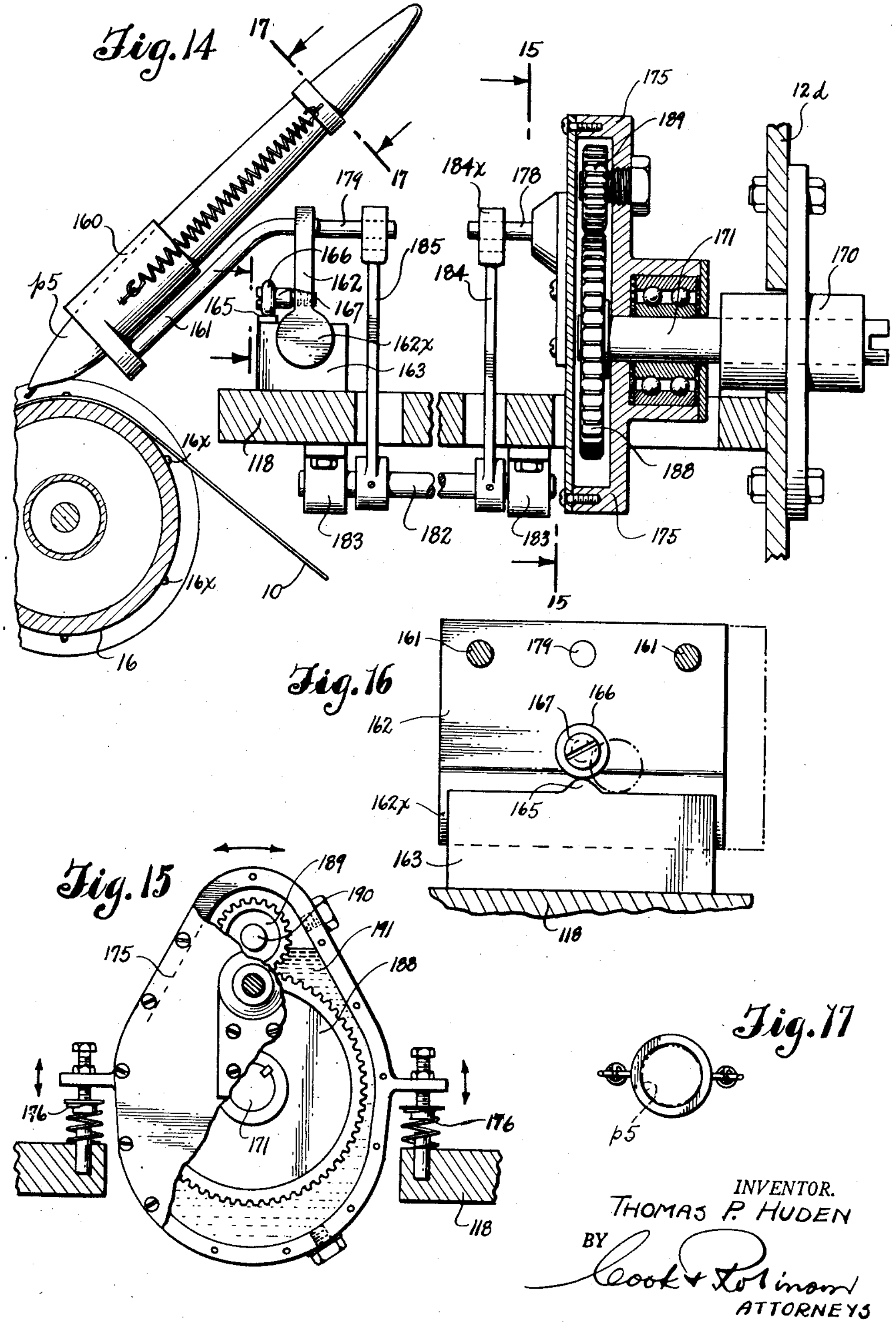
Fig. 14 is a vertical section taken substantially on line 14—14 in Fig. 2.
Fig. 15 is a cross-section on line 15—15 in Fig. 14.
Fig. 16 is an elevation showing the cam for lifting the scribing pen which records direction of the engine operation in shifting from one column to another.
Fig. 17 is an end view of the pen holder as seen from the plane of the line 17—17 in Fig. 14.

The endwise shifting of the bar 162 is controlled by the engine in operation through the devices shown best in Figs. 4, 14, 15 and 16, and described as follows:

Fixed in the back wall **12*d* of the cabinet 12, as seen in Fig. 2, is a bearing 170 in which a shaft 171 is rotatably contained. At its outer end, this shaft 171 is connected through the mediacy of a flexible shaft 172, or by other suitable means, with the drive shaft of the engine so that shaft 171 will rotate with and in accordance with the direction of rotation of the engine drive shaft. Mounted for rotative movement on the inner end portion of this shaft 171, as in Fig. 14, is a closed housing 175. The housing has spring mountings 176—176** at its opposite sides, as best shown in Fig. 15, whereby the rotative turning of the housing on its supporting shaft in opposite directions from a normal position, is permitted and also is limited.

Fixed to and extending from the forward side of housing 175, somewhat above the axial line of shaft 171, is a stub shaft 178, and this, as observed in Figs. 2 and 14, is aligned with a stub shaft 179 that is fixed in and extends rearwardly from the upper portion of the bar 162.

Rotatably supported at the underside of the shelf 118 on which the various slide guides are mounted, is a rocker shaft 182 contained at its ends in bearings 183—183. Fixed on the opposite ends of shaft 182 and extending upwardly therefrom and through openings in the shaft, are rocker levers 184 and 185 which, at their upper ends, are formed with yokes **184*x* and 185*x* which slidably contain the stub shafts 178 and 179 therein in such manner that any oscillating action of the housing 175 on shaft 171 will be transmitted through the rocker shaft to the bar 162** to effect its endwise adjustment accordingly.

Contained in the housing 175 and fixed on shaft 171, is a gear 188 meshing with a smaller gear 190. The gears are contained in oil, as indicated at 191 in Fig. 15. Thus, through the association of parts, above described, the turning of the engine shaft imparts, through the connection 172, a turning force to housing 175 whereby it is caused to move rotatably on shaft 171 in one direction or the other to the limited extent provided, in accordance with the direction of the turning of the engine and thus shift the bar 162 accordingly. If the engine is operating in an "ahead" direction, the bar 162 will shift the pen *p5* to the right. If it is reversed to the "astern" direction, the pen will be shifted to the left. At any time the engine is not running, the housing 175 will be held in vertical or neutral position and this places the cam roller 166 on top the cam 165, and causes the pen *p5* to be lifted off the record strip.

In order that readings, as being recorded on the record strip, may be read at any time, a metal plate 200 is fitted in opening 14, and is hinged along its lower edge for upward opening as has been indicated in Figs. 2 and 6. This metal plate has a transverse opening 201 of rectangular outline, as shown in Fig. 2, and in this opening that part of the record strip which has last moved past the recording pens, is exposed to view. Inscribed in this plate, across its lower edge, in columns and lanes registering in alignment with the columns and lanes of the record strip, are the operation indications, as has been clearly shown in Fig. 4.

A glass panel 210 is carried by the plate to protectively overlie the record strip. If it is desired to write in anything on the record strip, the plate is swung upwardly to an open position. For the writing in of information or data, the record strip 10 is formed with the column *b* which is unlined and plain.

The strip 10 is transversely ruled at regular intervals of spacing to set off minutes, these spaces successively pass the pens each minute. The column *f* contains the numerals whereby the minutes are successively numbered.

It is anticipated that continuous record strips of such length as to take care of ten days can be employed. However, shorter strips might be used, or joined end to end whenever necessary for longer voyages.

The recording cabinet might be located for use in the pilot house or in any other suitable location.

The means for effecting the operating connections between the levers 110, 132 and 102 might be through use of flexible shifting, gears or other devices whereby the actuation of any lever will effect a corresponding rotative action of the pen shifter gear wheels 120, 130 or 157.

Whenever it becomes necessary to rewind the weight suspending cable on the drum 31 shown in Fig. 3, this can be readily accomplished upon shifting the cone 20' to roll releasing position, and then applying a crank to a square end portion **30*x* of the shaft 30 on which the drum 31 is fixed. To permit this the shaft 30** is extended through a sidewall of the housing as shown in Fig. 2.

Apparatus of this character provides for the making of an accurate and positive record of all operations of the ship's telegraph in so far as the transmission of signals between pilot house and engine room is concerned.

Having thus described my invention, what I claim as new therein and desire to secure by Letters Patent is:

1. In apparatus of the character described, in combination, a moving record strip, lined to define separate longitudinal columns, a bar mounting block, a bar mounted thereon for endwise adjustment transversely of the strip and for forward and rearward tilting as it moves, a pen holding arm fixed to the bar and a pen held thereby in position for leaving a record line on said record strip as it moves, a cam fixed on the block and a cam roller on the bar at a location whereby in the moving of the pen from one column to another, it will engage the cam to tilt the bar and lift the pen from the record strip and means for shifting the bar endwise to locate the pen in the different columns of the record strip; said means comprising a rotatably mounted shaft adapted to be driven in opposite directions, a housing rotatably mounted on the shaft for limited turning in opposite directions under influence of frictional drag with changes of rotation of the shaft, and a mechanical connection between said housing and said bar whereby the bar is shifted endwise in accordance with turning of the housing.

2. In a recording apparatus, in combination, a roller equipped with coaxial trunnions at its ends, bearings mounting said trunnions therein for turning of the roller, a record strip passing over said roller and controlled in its direction and rate of travel by the direction and rate of turning of the roller, a shaft extended through the roller coaxially thereof, and beyond said trunnions, a gear fixed on one end of said shaft, a clock driven gear normally meshing with the first mentioned gear for driving said shaft; said shaft having a sliding keyed connection with said roller for driving it, and permitting limited endwise shifting of the shaft in the roller to disengage the gears, a yieldably releasable means normally holding the gears in meshed relationship, a roll on which the record strip, as advanced from the clock driven roller, is wound, a driving shaft for said roll, a cable winding drum, a cable wound thereon, a weight suspended by the cable to impart turning force to the drum; said roll mounting shaft having opposite end portions, means for relatively adjusting said end portions between positions for support and release of the roll for its removal, and a brake mechanism that automatically engages and holds the roll driving gears against turning incident to adjustment of the roll supports for releasing the roll and automatically moves to gear releasing position by return of the roll supports to roll supporting position.

3. A ship's telegraph mechanism, in combination, a pilot house mechanism and an engine room mechanism, each having a hand lever that is movable to any one of a plurality of signal transmitting positions, and a signal recording means comprising a record strip that is common to both mechanisms, a clock controlled means for advancing said record strip at a constant rate; said record strip having longitudinal columns ruled thereon for the recording of ahead and astern driving of the engine, a pen carrier supported above the strip, a pen applied thereto and positioned for marking a line in the columns, and means operable under control of the direction of rotation of the engine to shift the pen carrier in accordance with changes in direction of the engine to cause the pen to record said change on the record strip, said last mentioned means comprising a rotatably mounted shaft having a driving connection with the engine shaft, a housing yieldingly mounted for limited rotation in opposite directions on said shaft with its change in direction under influence of frictional drag, and a mechanical connection between the said housing and the last mentioned pen carrier means whereby the latter is shifted automatically in accordance with changes in position of said housing as effected by change in direction of the said rotatably mounted shaft.

4. The combination recited by claim 3 wherein said housing contains a liquid medium, and said driven shaft is equipped with a gear rotatable in said liquid to impart turning force to the housing under the influence of the liquid.

5. The combination recited by claim 2 wherein the gear braking means comprises a pushrod engageable at one end with a face of one of the gears, a spring acting against said rod to yieldingly urge it to braking position, a lever pivotally mounted between its ends and connected pivotally at its opposite ends to one end section of the roll mounting shaft and brake controlling knob having an operating connection with the lever for its actuation and having an adjustable connection with a fixed part of the mechanism.

6. The device of claim 3 wherein each of said sections of the roll mounting shaft includes at its end a conical head, and wherein said roll has a tubular core designed to receive the smaller ends of the conical heads therein and one of said shaft ends is mounted for endwise movement and a spring acts to urge it inwardly.

References Cited in the file of this patent

UNITED STATES PATENTS

| | | |
|---|---|---|
| 991,504 | Henkle | May 9, 1911 |
| 991,585 | Wilson et al. | May 9, 1911 |
| 997,075 | Menns | July 4, 1911 |
| 1,054,206 | Isakson | Feb. 25, 1913 |
| 1,604,732 | Au | Oct. 26, 1926 |
| 1,686,186 | Spitzglass | Oct. 2, 1928 |
| 1,961,170 | Robinson | June 5, 1934 |
| 2,451,365 | Spencer et al. | Oct. 12, 1948 |
| 2,724,631 | Ruhland | Nov. 22, 1955 |
| 2,772,940 | Golze | Dec. 4, 1956 |